Dec. 4, 1951   J. H. GEISSE   2,577,416
CROSS-WIND UNDERCARRIAGE
Filed March 23, 1949

INVENTOR
John Harkin Geisse

Patented Dec. 4, 1951

2,577,416

UNITED STATES PATENT OFFICE 2,577,416

CROSS-WIND UNDERCARRIAGE

John Harlin Geisse, Washington, D. C.

Application March 23, 1949, Serial No. 82,960

5 Claims. (Cl. 244—103)

My invention generally relates to airplanes with cross-wind landing gears and has for its objective an improvement in the cross-wind taxiing characteristics of such airplanes.

Many airplanes equipped with fixed main wheels have used independent wheel braking for steering purposes. In such airplanes the tail wheel has been caster mounted. However, experience proved that cross-wind operation with freely castered tail wheel and fixed main wheels required an excessive amount of braking to counteract the turning moments created by the wind forces on the side of the airplane. It was also found with those airplanes having propellers on each side that uneven application of power to these propellers also created turning moments which were difficult to counteract with the brakes. To overcome this difficulty it has been customary to provide a tail wheel lock which the pilot could apply after he had established his desired heading.

When the main wheels of such airplanes have been castered to provide for cross-wind landings and take-offs, it has been necessary to remove the tail wheel lock since, if the tail wheel were locked straight ahead and the main wheels castered, the airplane would turn. This then reintroduced the need for excessive braking, since the side loads on the main wheels plus the wind force on the side of the airpane still provided a turning moment which had to be counteracted with the brakes. When the main wheels are castered to their limit, the performance becomes practically the same as with fixed main wheels and freely castered tail wheel.

My invention consists essentially of providing caster restraints to the casterable tail wheels of such airplanes so that they may function subtantially as have the locked wheels when used with fixed main wheels and yet not cause the airplane to turn when the wheels are castered, and I have accomplished this objective without providing any linkage between the tail wheel and the main wheels.

My invention is described in the following specification and the attached drawings which form a part thereof, in which.

Figure 1:
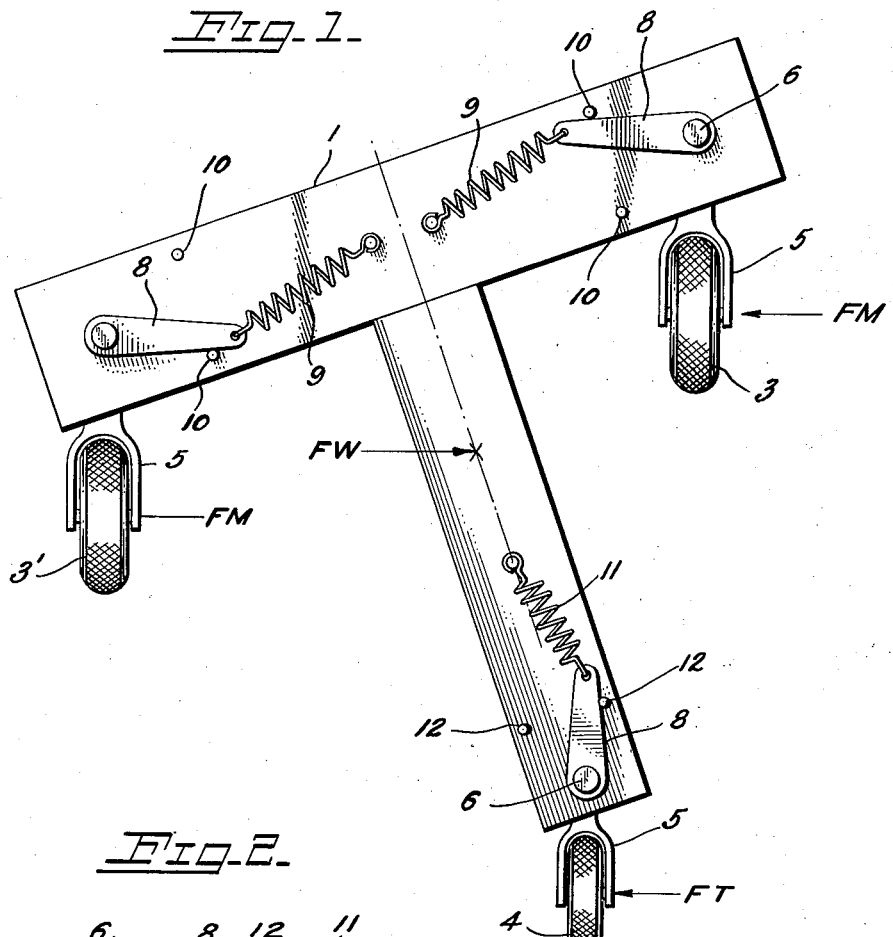
Figure 1 is a plan view showing an application of my invention as it would appear when the cross-wind force is sufficient to caster the wheels up against their respective stops.
Figure 2:
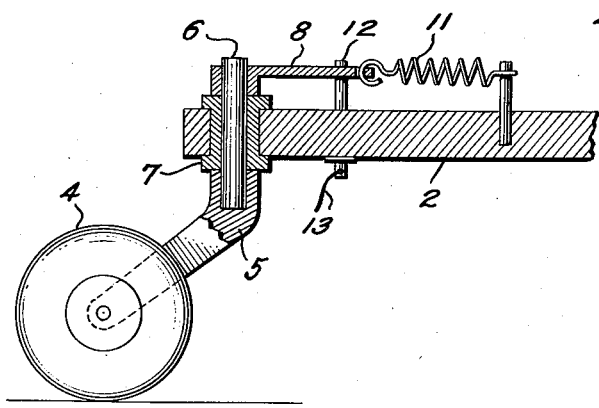
Figure 2 is a section showing the casterable mountings of the wheels and Figure 3 is a detail of the controllable stops for the tail wheel.
Figure 3:
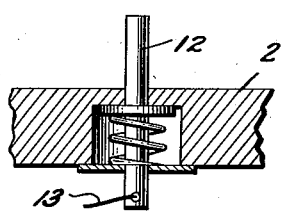

In all figures the numerals 1 and 2 indicate the structural elements of the airplane to which the wheels would be attached. The main wheels 3 and 3' and the tail wheel 4 are all supported in wheel forks 5 which are attached to the spindles 6. The spindles 6 are rotatably held by suitable bearings 7 attached to suitable members 1 and 2 of the airplane structure. Each spindle 6 has rigidly attached to its upper end a lever arm 8.

Springs 9 are attached to and extend between lever arms 8 of the main wheels and the airframe member 1 to provide yieldable restraints to the castering of the main wheels.

Stops 10 are also provided to place a limit on the maximum angle of caster of the main wheels.

Another spring 11 is attached and extends between lever arm 8 of the tail wheels and the airframe member 2 to provide yieldable restraint to the castering of the tail wheel. Stops 12, retractable by the pilot by suitable controls 13 extending to the cockpit, are provided to limit the degree of castering of the tail wheel when the pilot so desires.

In Figure 1 the arrow FT represents the force applied to the tail wheel by its contact with the ground and arrows FM represent the similar forces applied to the main wheels. Between these forces is the force of the wind on the airplane represented by the arrow FW. For stable conditions these forces must all balance out without leaving any unbalanced moment if the need for applying a correcting moment is to be avoided.

Such a balance will be closely approximated when all of the wheels are castered through their full range, provided that the range of the tail wheel is made the same as that of the main wheels. Therefore, in cross-wind taxiing under these conditions the airplane will maintain a straight path with a minimum use of the brakes. It will, in fact, perform just like an airplane with fixed main wheels and locked tail wheel except that the airplane will not be lined up with its path.

Under conditions less severe a balance can also be approximated by using the proper relationship between the strengths of the springs 9 and the spring 11. This relationship will be determined by the fore and aft location of the cross-wind force FW.

Having thus described my invention, I claim:

1. In an airplane having castered main wheels and a castered tail wheel, the combination of stops limiting the degree of castering of the main wheels and pilot controllable stops limiting the degree of castering of the tail wheel.

2. In an airplane having castered main wheels and a castered tail wheel, the combination of stops limiting the degree of castering of the main wheels and pilot controllable stops limiting the degree of castering of the tail wheel to substantially the same degree.

3. In an airplane having castered main wheels and a castered tail wheel, the combination of caster restraints on the main wheels and the tail wheel of such proportionate strengths that the tire to ground reactions provide a turning moment on the airplane substantially equal and opposite to its weather vaning moment.

4. In an airplane having castered main wheels and a castered tail wheel, the combination of yieldable restraints to the castering of each main wheel and a yieldable restraint for the tail wheel of substantially twice the strength of the restraints for each main wheel.

5. In an airplane having castered main wheels and a castered tail wheel, the combination of yieldable caster restraints for the main wheels and other yieldable caster restraints for the tail wheel and stops limiting the castering of all wheels to substantially the same amount.

JOHN HARLIN GEISSE.

REFERENCES CITED

The following references are of record in the file of this patent:

UNITED STATES PATENTS

| Number | Name | Date |
|---|---|---|
| 2,312,553 | Hudson | Mar. 2, 1943 |

FOREIGN PATENTS

| Number | Country | Date |
|---|---|---|
| 883,921 | France | Apr. 5, 1943 |